(12) United States Patent
Lecroart et al.

(10) Patent No.: US 8,668,046 B2
(45) Date of Patent: Mar. 11, 2014

(54) BAFFLE

(75) Inventors: Guillaume Lecroart, Silly (BE); Vincent Belpaire, Brussels (BE)

(73) Assignee: Sika Technology, AG, Baar (CH)

(*) Notice: Subject to any disclaimer, the term of this patent is extended or adjusted under 35 U.S.C. 154(b) by 0 days.

(21) Appl. No.: 13/057,833

(22) PCT Filed: Aug. 5, 2009

(86) PCT No.: PCT/EP2009/060127
§ 371 (c)(1),
(2), (4) Date: Apr. 27, 2011

(87) PCT Pub. No.: WO2010/015645
PCT Pub. Date: Feb. 11, 2010

(65) Prior Publication Data
US 2011/0192675 A1    Aug. 11, 2011

(30) Foreign Application Priority Data
Aug. 5, 2008   (EP) .................................... 08161795

(51) Int. Cl.
*F01N 1/02* (2006.01)
*E04B 1/82* (2006.01)

(52) U.S. Cl.
USPC .......................................... 181/264; 181/295

(58) Field of Classification Search
USPC .............. 181/207, 264, 284, 295; 296/187.02
See application file for complete search history.

(56) References Cited

U.S. PATENT DOCUMENTS

| | | | |
|---|---|---|---|
| 3,610,457 A * | 10/1971 | Opalewski | 220/563 |
| 4,517,231 A * | 5/1985 | May et al. | 428/36.92 |
| 5,185,117 A | 2/1993 | Hawley | |
| 6,114,004 A | 9/2000 | Cydzik et al. | |
| 6,186,769 B1 | 2/2001 | Hawley | |
| 6,296,298 B1 | 10/2001 | Barz | |
| 6,311,452 B1 * | 11/2001 | Barz et al. | 296/207 |
| 6,368,438 B1 | 4/2002 | Chang et al. | |
| 6,368,538 B1 * | 4/2002 | Kitterman | 264/274 |
| 6,387,470 B1 | 5/2002 | Chang et al. | |
| 6,419,305 B1 | 7/2002 | Larsen | |
| 6,649,243 B2 * | 11/2003 | Roberts et al. | 428/99 |
| 6,786,533 B2 | 9/2004 | Bock et al. | |
| 6,890,021 B2 | 5/2005 | Bock et al. | |

(Continued)

FOREIGN PATENT DOCUMENTS

EP    1593588 A2    11/2005
EP    1607204 A2    12/2005
(Continued)

OTHER PUBLICATIONS

International Search Report for PCT/EP2009/060127.

*Primary Examiner* — Jeremy Luks
(74) *Attorney, Agent, or Firm* — Harness, Dickey & Pierce, P.L.C.

(57) ABSTRACT

A baffle is provided that includes at least one carrier and a sealer disposed in a recess. When placed in a cavity, such as a vehicle cavity, sealer also expands into the cavity to seal the cavity. Baffle can be modified by including an insert within carrier to increase the weight, density, and structural rigidity of baffle, without altering the exterior dimensions of baffle. A baffle that includes an insert can be customized based on a particular application, without requiring time-consuming and expensive tooling changes.

26 Claims, 4 Drawing Sheets

(56) References Cited

U.S. PATENT DOCUMENTS

| | | | |
|---|---|---|---|
| 6,905,745 B2 | 6/2005 | Sheldon et al. | |
| 6,920,693 B2 | 7/2005 | Hankins et al. | |
| 6,953,219 B2 | 10/2005 | Lutz et al. | |
| 6,976,437 B2 * | 12/2005 | Fisch et al. | 108/57.25 |
| 7,077,460 B2 | 7/2006 | Czaplicki et al. | |
| 7,105,112 B2 | 9/2006 | Czaplicki et al. | |
| 7,290,828 B2 * | 11/2007 | Kosal et al. | 296/187.02 |
| 7,296,847 B2 | 11/2007 | Czaplicki et al. | |
| 7,313,865 B2 | 1/2008 | Czaplicki et al. | |
| 7,478,478 B2 | 1/2009 | Lutz et al. | |
| 7,479,246 B2 | 1/2009 | Muteau et al. | |
| 7,494,179 B2 | 2/2009 | Deachin et al. | |
| 2002/0160130 A1 | 10/2002 | Sheldon et al. | |
| 2003/0057737 A1 | 3/2003 | Bock et al. | |
| 2003/0184121 A1 | 10/2003 | Czaplicki et al. | |
| 2003/0218019 A1 | 11/2003 | Le Gall et al. | |
| 2004/0143969 A1 | 7/2004 | Czaplicki et al. | |
| 2004/0164588 A1 | 8/2004 | Lutz et al. | |
| 2004/0207233 A1 | 10/2004 | Bock et al. | |
| 2004/0224108 A1 | 11/2004 | Sheldon et al. | |
| 2004/0239148 A1 * | 12/2004 | Ratet | 296/187.02 |
| 2004/0266899 A1 | 12/2004 | Muenz et al. | |
| 2005/0082111 A1 * | 4/2005 | Weber | 181/204 |
| 2005/0212332 A1 | 9/2005 | Sheldon et al. | |
| 2005/0249936 A1 * | 11/2005 | Ui et al. | 428/304.4 |
| 2006/0006695 A1 | 1/2006 | Lutz et al. | |
| 2006/0008615 A1 | 1/2006 | Muteau et al. | |
| 2006/0267378 A1 | 11/2006 | Czaplicki et al. | |
| 2007/0045866 A1 | 3/2007 | Gray et al. | |
| 2007/0080559 A1 | 4/2007 | Stolarski et al. | |
| 2007/0090666 A1 | 4/2007 | Brennecke et al. | |
| 2008/0202674 A1 | 8/2008 | Schneider et al. | |
| 2008/0257491 A1 | 10/2008 | Czaplicki et al. | |

FOREIGN PATENT DOCUMENTS

| | | |
|---|---|---|
| EP | 1609577 A1 | 12/2005 |
| EP | WO2007/146726 A2 | 12/2007 |
| WO | WO-2007/143646 A2 | 12/2007 |
| WO | WO-2008/073503 A1 | 6/2008 |
| WO | WO-2009/049886 | 4/2009 |

* cited by examiner

BAFFLE

CROSS-REFERENCE TO RELATED APPLICATIONS

This application claims priority to EP application number 08161795.3 filed on Aug. 5, 2008, and International Application No. PCT/EP2009/060127 filed on Aug. 5, 2009, the entirety of which are hereby incorporated by reference.

BACKGROUND

Various commercial objects benefit from a rigid structural foundation while ideally remaining light-weight. In many circumstances, these objects are produced with frames that define internal cavities. For instance, the frame may be formed from a metal such as steel, and leaving a portion of the frame hollow (i.e., the cavity) reduces the weight of the frame. However, the cavity may foster an increase in sound and vibrations. A common approach to mitigating the added sound and vibrations within cavities includes sealing the cavity, such as by using a baffle. Sealing the cavity is an important aspect of designing objects to be light-weight, while still providing valued vibration dampening and noise abatement. Such technology is often used in vehicles, including automobiles and airplanes, but may be used in other industries as well. Traditionally, a baffle is disposed across the cavity, and a sealer, such as an expanding foam, expands to fill in space around the baffle, which prevents fluid flow through the cavity, ultimately resulting in decreased noise and vibrations.

Certain design factors can affect the performance of a baffle. For example, a baffle can include a rigid carrier that supports a layer of expanding foam. The weight and thickness of the rigid carrier can affect how the baffle reacts to various noise and vibration frequencies. Unfortunately, certain baffle designs that include a rigid carrier cannot be modified without expensive changes in tooling and manufacturing. Therefore, it can be time-consuming and expensive to tailor a baffle to a particular application, or to change the design to meet certain customer requirements.

SUMMARY

Disclosed are various embodiments of a baffle for reducing noise and vibration within a hollow body, such as a cavity within a vehicle frame. A baffle typically includes at least one carrier and a sealer disposed in a recess. When placed in a cavity, such as a vehicle cavity, the sealer expands into the cavity to seal the cavity. The baffle can be modified by including an insert within the carrier to increase the weight, density, and structural rigidity of the baffle, without altering the exterior dimensions of the baffle. A baffle that includes an insert can be customized based on a particular application, without requiring time-consuming and expensive tooling changes.

DETAILED DESCRIPTION

A baffle can be used to reduce noise and vibration without largely increasing the weight of the frame. The performance of a baffle can be measured by the reduction of noise and vibration, typically by analyzing particular frequency ranges. Certain applications are susceptible to different frequency ranges of noise and vibration, possibly depending on the location, vehicle type, use conditions, etc. A baffle can be configured to reduce more specific frequency ranges based on a particular application. Customizing a baffle can be accomplished by including a metal insert into a baffle. The size, shape, and/or weight of the metal insert can be based on a particular application in order to change the performance characteristics of the baffle. Modifying a baffle by adding and/or changing the dimensions of a metal insert can greatly enhance the baffle's performance, tailoring the baffle for a particular application, without requiring expensive and time consuming tooling changes. In addition, the exterior dimensions of the baffle can remain constant while the shape, size, and material type of the insert can be changed to meet certain customer requirements by further dampening a particular frequency range of noise and/or vibration.

Figure 1A:
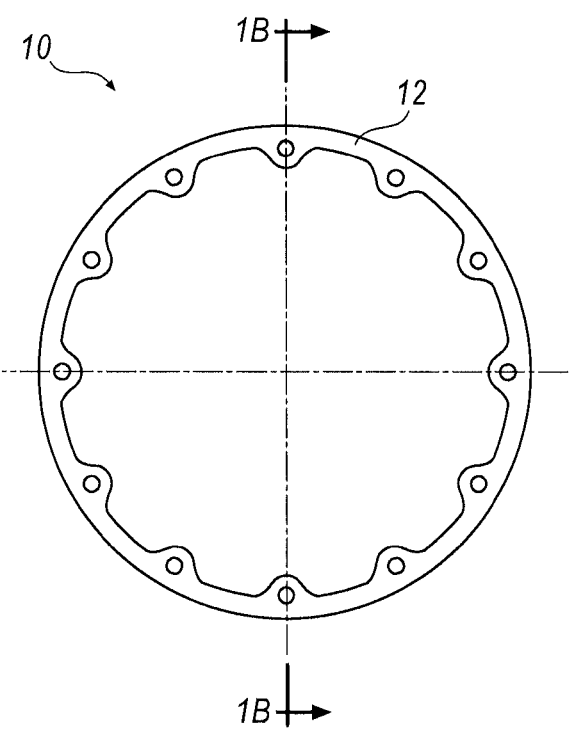
FIG. 1A is a front view of a ring-style baffle that includes an unexpanded sealer according to an embodiment.
Figure 1B:
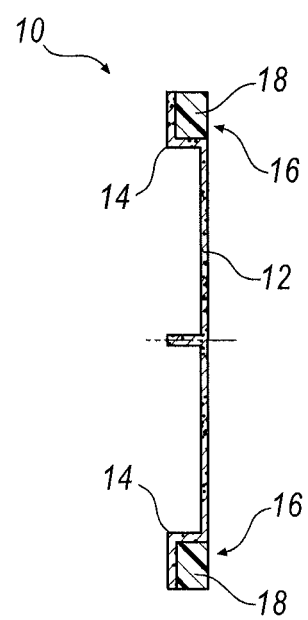
FIG. 1B is a cut-away view of the ring-style baffle of FIG. 1A taken along line 1B.

A baffle can be configured to seal a cavity of any shape and size. For example, a baffle can be configured in a generally circular fashion, a sandwich, a racetrack, etc. Generally, a baffle includes a rigid carrier and a sealer. As shown in FIGS. 1A and 1B, a baffle 10 is configured as a ring in order to fill a generally cylindrical cavity. FIG. 1A is a front view of baffle 10. FIG. 1B is a cut-away view taken along line 1B of FIG. 1A. Baffle 10 includes a rigid carrier 12 that has a generally 'L' shaped outer portion 14. Outer portion 14 includes a recess 16 for receiving a sealer material 18. Recess 16 can be attached to carrier 12. Recess 16 can also be integrally formed from carrier 12, thereby forming recess 16 from an exterior surface of carrier 12.

Sealer 18 is typically any material suitable for filling a cavity space and adhering to carrier 12 and a cavity wall in order to seal or dampen noise and vibration within a cavity. Sealer 18 can be an expandable material, such as an expandable foam or resin. Typically, sealer 18 is an expandable foam that is heat activated. For example, in many vehicle applications, sealer 18 is a heat-activated expandable foam that expands using the heat generated during a baking process. As sealer 18 expands, sealer 18 fills the volume of a cavity in a vehicle frame, thereby improving the transmission loss (i.e., noise reduction). In other words, baffle 10 provides greater sound and vibration dampening, especially at higher frequencies, when sealer 18 expands to fill a space within a vehicle frame. Sealer 18 also provides a barrier against dust and fluids.

A baffle can be configured for a specific application. For example, certain areas of a vehicle frame can be susceptible to different frequencies of noise and vibration. A baffle can be configured to reduce certain frequency ranges by changing the thickness and/or density of the rigid carrier. The carrier may be a rigid plastic that is made through an injection molding or other manufacturing process. Unfortunately, increasing the thickness of the carrier can require time-consuming and expensive tooling changes. In addition, increasing the thickness using conventional injection molding can cause additional problems, such as substantially increased cooling time and material shrinkage. However, it may be desirable to change the thickness and/or density of the carrier in order to change the performance of a baffle for a specific application. In addition, it may be desirable to alter the performance of a baffle without engaging in substantial tooling changes.

Figure 2:
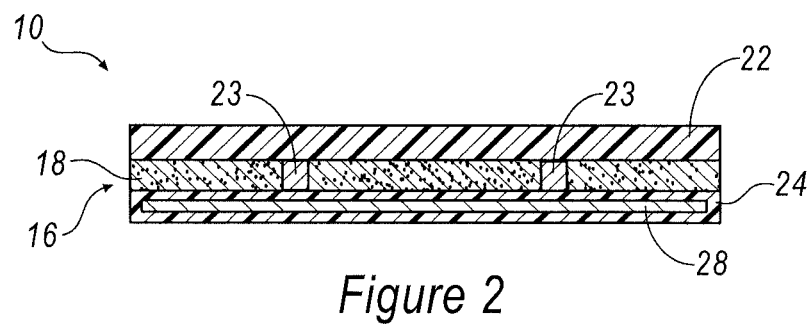
FIG. 2 is a cut-away view of a sandwich-style baffle having an unexpanded sealer according to an embodiment.

FIG. 2 illustrates another example of a baffle 10 in a sandwich configuration. Baffle 10 includes a first carrier 22 and a second carrier 24 separated by a space or recess 16 that is filled with sealer 18. Similarly, the distance between first carrier 22 and second carrier 24 may be any distance. For example, first and second carriers 22, 24 can be as close as 2 mm apart, and may be as far as 150 mm apart. Of course, first and second carriers 22, 24 may be closer than 2 mm apart or farther than 150 mm apart or any distance therebetween. In a sandwich configuration, baffle 10 may also include one or more connectors 23 that secure first and second carriers 22, 24 together.

As illustrated in FIG. 2, second carrier 24 includes an insert 28 that is encapsulated within second carrier 24. Insert 28 may be completely encapsulated within second carrier 24, or may only be partially encapsulating, leaving at least a portion of insert 28 exposed. Of course, first carrier 22 can also include an insert 28, depending on the application. Insert 28 can be a rectangular-shaped metal sheet that can be included to increase the weight and density of baffle 10. Of course, insert 28 can be any shape and size depending on the shape and size of carriers 22, 24. Insert 28 may be included within second carrier 24 through an overmolding process, for example. By including insert 28 through an overmolding process, the density and rigidity of second carrier 24 can be increased without increasing the overall or exterior size of second carrier 24. Additionally, the performance of baffle 10 can be modified simply by changing the size and/or material of insert 28. In addition, manufacturing time is minimally impacted, and the performance of baffle 10 can be changed without necessarily requiring expensive tooling changes, since the overall size of second carrier 24 remains constant.

Figure 3:
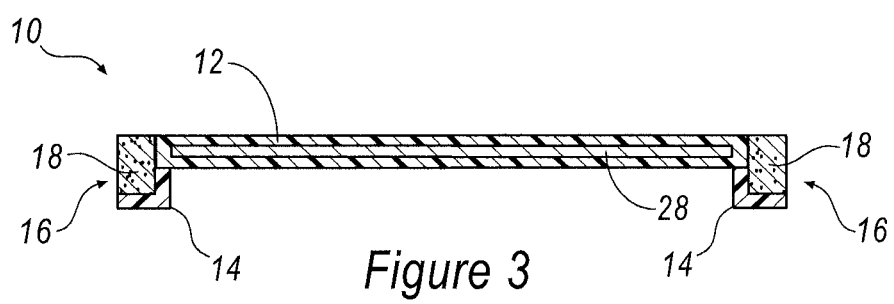
FIG. 3 is a cut-away view of another ring-style baffle having an shaped outer portion that includes an unexpanded sealer according to another embodiment.

FIG. 3 illustrates another example of a baffle 10 configured as a sealer ring having an shaped outer portion 14. Baffle 10 includes a rigid carrier 12 that includes an insert 28. Baffle 10 also includes a generally 'L' shaped outer portion 14 that is connected to carrier 12 and configured to receive a sealer material 18, such as an expandable foam. Of course, outer portion 14 can be integrally formed in carrier 12. As illustrated in FIG. 3, insert 28 is encapsulated within carrier 12, such as through an overmolding process. Baffle 10 is also configured for a generally cylindrically-shaped cavity. However, baffle 10 can be configured to fill a cavity of any shape and size. Sealer 18 is positioned in recess 16 to expand outwardly away from a center of baffle 10. Additionally, outer portion 14 is generally 'L' shaped, forcing sealer 18 both upward and outward.

Figure 4:
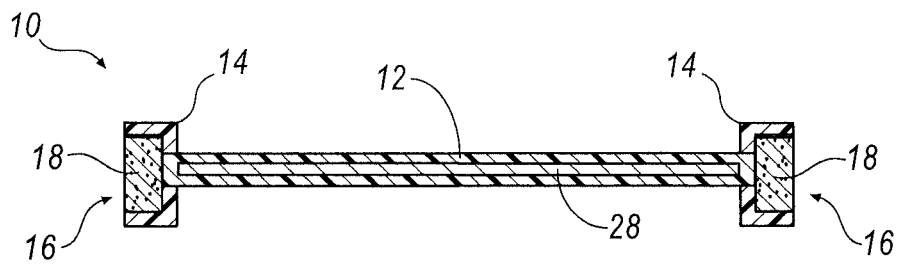
FIG. 4 is a cut-away view of another ring-style baffle having a 'C' shaped outer portion that includes an unexpanded sealer according to another embodiment.

FIG. 4 illustrates another ring-style baffle 10 having a 'C' shaped outer portion 14. Baffle 10 includes a rigid carrier 12 that includes an insert 28. Baffle 10 also includes a generally 'C' shaped outer portion 14 configured to receive a sealer material 18 within a recess 16. As illustrated in FIG. 4, insert 28 is also encapsulated within carrier 12. Baffle 10 is also configured for a generally cylindrically-shaped cavity. Sealer 18 is disposed within recess 16 within outer portion 14. Outer portion 14 is configured such that sealer 18 will expand outwardly away from a center of baffle 10. Additionally, outer portion 14 is generally 'C' shaped, directing sealer 18 outward while limiting sealer 18 from expanding above and below carrier 12.

Figure 5:
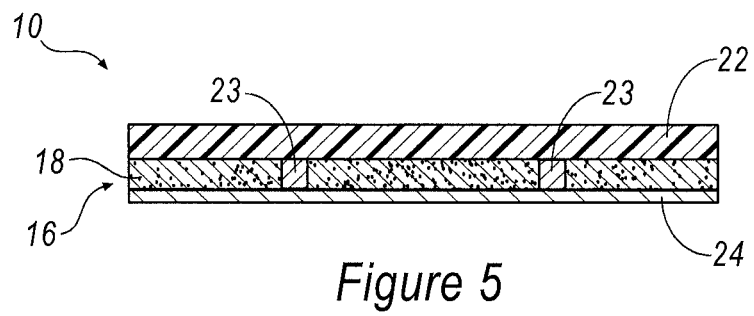
FIG. 5 is a cut-away view of another sandwich-style baffle having an unexpanded sealer according to another embodiment.

FIG. 5 illustrates another example of a sandwich style baffle 10. Baffle 10 includes a first carrier 22 and a second carrier 24 that are separated by a space or recess 16 that is filled with sealer 18. However, as illustrated in FIG. 5, first carrier 22 is a rigid plastic, while second carrier 24 is made from a metal, such as a steel or aluminum. As previously discussed, baffle 10 may also include one or more connectors 23 that secure first and second carriers 22, 24 together in a sandwich configuration. The performance of baffle 10 can be modified simply by changing the size and/or material of second carrier 24, without requiring changes to any manufacturing process relating to plastic. In addition, manufacturing time is minimally impacted, and the performance of baffle 10 can be changed without necessarily requiring expensive tooling changes. Second carrier 24 is a metal that is substantially exposed in baffle 10. In such a configuration, baffle 10 may be smaller than other sandwich style configurations, while also being heavier and more rigid. Also, because second carrier 24 is made from metal, it can be welded to a metal cavity wall.

Figure 6:
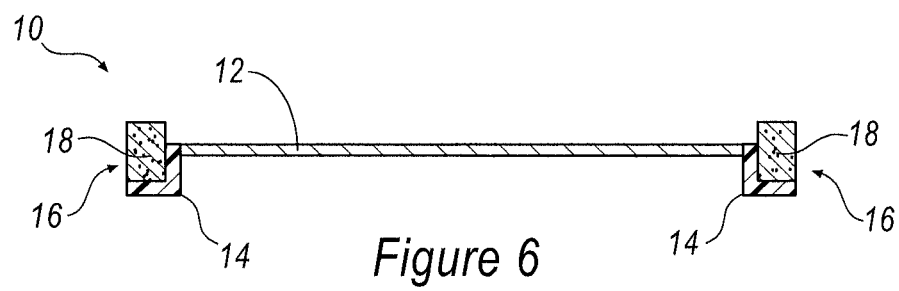
FIG. 6 is a cut-away view of another ring-style baffle having an 'L' shaped outer portion that includes an unexpanded sealer according to another embodiment.

FIG. 6 illustrates another example of a baffle 10 configured as a sealer ring having an 'L' shaped outer portion 14. Baffle 10 includes a rigid carrier 12 made from a metal. Baffle 10 also includes a generally 'L' shaped outer portion 14 that is connected to carrier 12 and configured to receive a sealer material 18, such as an expandable foam. Baffle 10 is also configured for a generally cylindrically-shaped cavity. However, baffle 10 can be configured to fill a cavity of any shape and size. Sealer 18 is positioned in recess 16 to expand outwardly away from a center of baffle 10. Additionally, outer portion 14 is generally shaped, forcing sealer 18 both upward and outward. Carrier 12 is a metal that is substantially exposed in baffle 10. In such a configuration, baffle 10 may be smaller than other, similarly shaped configurations, while also being heavier and more rigid. Also, because carrier 12 is at least partially exposed and made from metal, it can be welded to a metal cavity wall.

Figure 7:
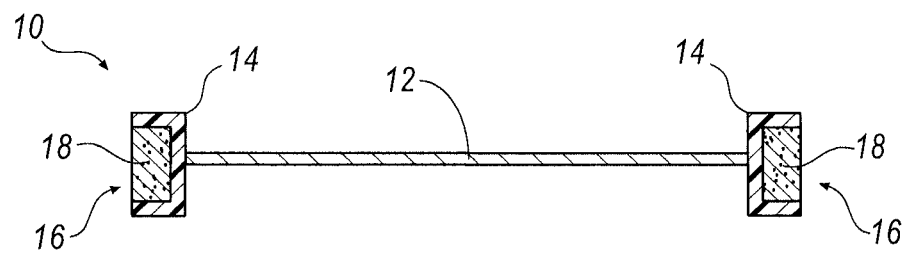
FIG. 7 is a cut-away view of another ring-style baffle having a 'C' shaped outer portion that includes an unexpanded sealer according to another embodiment.

FIG. 7 illustrates another ring-style baffle 10 having a 'C' shaped outer portion 14. Baffle 10 includes a rigid carrier 12 made from a metal. Baffle 10 also includes a generally 'C' shaped outer portion 14 configured to receive a sealer material 18 within a recess 16. Baffle 10 is also configured for a generally cylindrically-shaped cavity. Sealer 18 is positioned in recess 16 to expand outwardly away from a center of baffle 10. Additionally, outer portion 14 is generally 'L' shaped, forcing sealer 18 both upward and outward. Outer portion 14 can be connected to carrier 12, or integrally formed with carrier 12. Carrier 12 is a metal that is substantially exposed in baffle 10. In such a configuration, baffle 10 may be smaller than other, similarly shaped configurations, while also being heavier and more rigid. Also, because carrier 12 is at least partially exposed and made from metal, it can be welded to a metal cavity wall.

Figure 8:
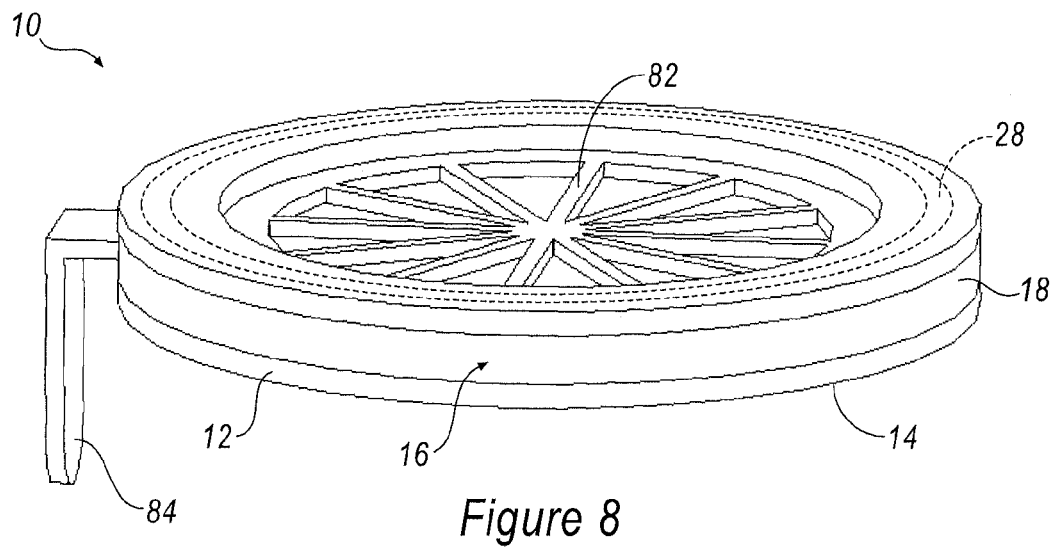
FIG. 8 is a perspective view of another ring-style baffle having ribs and clip according to another embodiment.

FIG. 8 is a perspective view of another ring-style baffle 10 having a 'C' shaped outer portion 14. Baffle 10 includes a rigid carrier 12 that can also include an insert 28. Baffle 10 also includes a generally 'C' shaped outer portion 14 configured to receive a sealer material 18 within a recess 16. As illustrated in FIG. 8, an insert 28 is also encapsulated within carrier 12. Baffle 10 is also configured for a generally cylindrically-shaped cavity. Sealer 18 is disposed within recess 16 within outer portion 14. Outer portion 14 is configured such that sealer 18 will expand outwardly away from a center of baffle 10. Additionally, outer portion 14 is generally 'C' shaped, directing sealer 18 outward while limiting sealer 18 from expanding above and below carrier 12.

Baffle 10 also includes supporting ribs 82 interconnecting carrier 12, thereby increasing the structural rigidity and weight of baffle 10. Ribs 82 may be made of either metal or rigid plastic. For example, ribs 82 may be integrally part of insert 28, while carrier 12 is overmolded around insert 28. Additionally, baffle 10 also includes a clip 84 that can also be connected to or integrally part of insert 28. Clip 84 can be welded to a cavity wall, or configured to mate with a complementary receptacle within a cavity. Since clip 84 can be integrally formed with insert 28, baffle 10 can have more structural rigidity than similarly shaped baffles, while also being capable of being welded to a cavity wall because clip 10 can be made from metal. Of course, a clip can be added to a baffle of any configuration, such as those previously described, by integrally forming clip 84 with insert 28 and then including insert 28 with the carrier, as previously discussed. In addition, the performance of baffle 10 can be modified based on a particular application or customer requirements without affecting the overall size (e.g. exterior dimensions) simply by modifying the size, shape, and/or material of insert 28. Generally, insert 28 can be added to a baffle through various processes, including an injection molding or an overmolding process.

Figure 9:
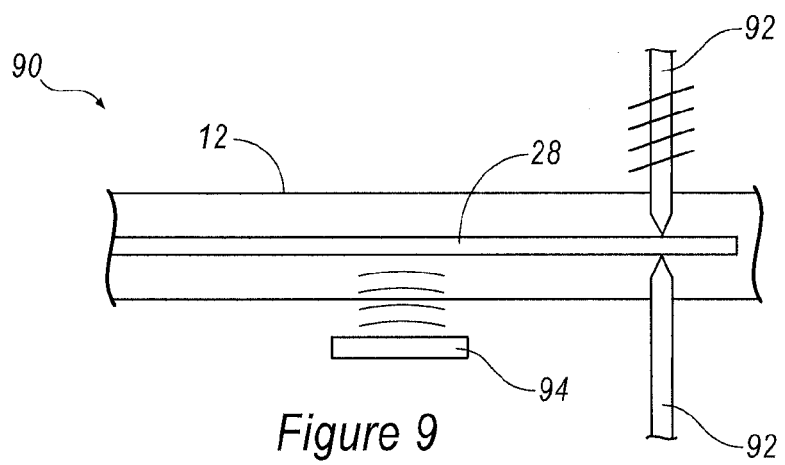
FIG. 9 illustrates an exemplary process for including an insert in a carrier of a baffle.

FIG. 9 illustrates an exemplary process 90 for including an insert 28 in a carrier 12 of a baffle. During an injection or overmolding process, insert 28 can be held in place using spring holders 92, typically within a die or a mold. Generally, such processes use heated or molten plastic, supply such liquefied plastic to the mold using pressure, and allow the plastic to cool and harden. Insert 28 can also be held in place using one or more magnets 94 when insert 28 is made from certain materials, such as steel. For example, magnets 94 could be used to suspend insert 28 while a plastic is overmolded around, thereby forming carrier 12. Magnet 94 could also hold insert 28 in place by making direct contact with insert 28, and releasing insert 28 and retreating from the mold after the plastic has covered insert 28, but before the plastic has hardened. Additionally, magnet 94 can be used to move insert 28 into a mold and hold insert 28 in place within the mold during the injection and cooling phase of the manufacturing process. Newly formed carrier 12, including insert 28, can then be ejected from the mold using an ejector pin that pushes carrier 12 out of the mold, pushing against the magnetic force of magnet 94.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A baffle system configured to be inserted into a hollow structure, comprising:
   a rigid carrier having an exterior surface forming at least one recess, the rigid carrier defining an exterior dimension;
   an insert substantially disposed within the exterior dimension of said rigid carrier, the insert having certain physical characteristics selected to cooperate with physical characteristics of said rigid carrier to dampen one of a noise and a vibration within a desired frequency range when inserted in the hollow structure; and
   a sealer disposed in said recess, wherein said sealer is an expandable material configured to adhere to said carrier.

2. A baffle system as set forth in claim 1, further comprising a second carrier, wherein said recess is formed in between said rigid carrier and said second carrier.

3. A baffle system set forth in claim 2, further comprising at least one connector interconnecting said rigid carrier to said second carrier.

4. A baffle system as set forth in claim 2, wherein said second carrier includes an insert substantially disposed within said second carrier.

5. A baffle system as set forth in claim 1, wherein said rigid carrier is formed from a plastic material.

6. A baffle system as set forth in claim 1, wherein said sealer is a heat activated expandable foam.

7. A baffle system as set forth in claim 1, wherein said rigid carrier is configured in a ring-style configuration and formed from a plastic material.

8. A baffle system as set forth in claim 1, wherein said rigid carrier is a generally circular ring having a plurality of recesses formed in an outer portion.

9. A baffle system as set forth in claim 8, further comprising a plurality of ribs that interconnect an interior portion of said ring-shaped rigid carrier.

10. A baffle system as set forth in claim 9, wherein said ribs are integrally formed with said insert and at least a portion of said ribs are exposed.

11. A baffle system as set forth in claim 1, further comprising a clip connected to said insert and configured to secure said carrier to a cavity wall.

12. A baffle system as set forth in claim 11, wherein said clip is integrally formed with said insert and at least a portion of said clip is exposed.

13. A baffle system as set forth in claim 1, wherein said rigid carrier is a generally circular ring having an 'L' shaped outer portion.

14. A baffle system as set forth in claim 1, wherein said rigid carrier is a generally circular ring having a 'C' shaped outer portion.

15. A baffle as set forth in claim 1, wherein the rigid carrier substantially envelops the insert.

16. A baffle system as set forth in claim 1, wherein the insert is formed from a metal material.

17. A method of forming a rigid carrier for a baffle configured to be inserted into a hollow structure, said method comprising:
    providing a mold configured to facilitate the formation of a rigid carrier in the shape of the mold, the rigid carrier having an exterior surface forming at least one recess, the mold defining a common external dimension;
    selecting an insert having certain physical characteristics configured to cooperate with physical characteristics of said rigid carrier to dampen one of a noise and a vibration within a desired frequency range when inserted in the hollow structure;
    securing said insert in place within said mold;
    supplying a molten plastic to said mold such that said molten plastic substantially envelops said insert within the common external dimension;
    removing a newly formed rigid carrier from said mold, wherein said rigid carrier includes said insert substantially disposed within said rigid carrier; and
    providing a sealer disposed in said recess, wherein said sealer is an expandable material configured to adhere to said carrier.

18. A method as set forth in claim 17, wherein securing said insert within said mold includes applying a force to said insert using at least one spring holder.

19. A method as set forth in claim 17, wherein securing said insert within said mold includes applying a force to said insert using at least one magnet.

20. A method as set forth in claim 17, wherein selecting said insert includes developing a set of desired dimensions of said insert.

21. A method as set forth in claim 17, further comprising ensuring that at least a portion of said insert remains exposed after a cooling period.

22. A method as set forth in claim 17, further comprising including a clip with said insert.

23. A method as set forth in claim 17, wherein the insert is formed from a metal material.

24. A baffle, comprising:
    a rigid carrier having an exterior surface forming at least one recess, wherein said rigid carrier is a generally circular ring having a plurality of recesses formed in an outer portion;
    a plurality of ribs that interconnect an interior portion of said ring-shaped rigid carrier;
    an insert substantially disposed within said rigid carrier; and
    a sealer disposed in said recess, wherein said sealer is an expandable material configured to adhere to said carrier.

25. A baffle as set forth in claim 24, wherein said ribs are integrally formed with said insert and at least a portion of said ribs are exposed.

26. A baffle as set forth in claim 15, wherein the insert is completely encapsulated within the rigid carrier.

* * * * *